United States Patent [19]

Scherbatskoy

[11] Patent Number: 5,414,673
[45] Date of Patent: May 9, 1995

[54] SONIC MEASUREMENT WHILE DRILLING

[76] Inventor: Serge A. Scherbatskoy, 3921 Clayton Rd. E., Fort Worth, Tex. 76116

[21] Appl. No.: 971,312

[22] Filed: Nov. 4, 1992

[30] Foreign Application Priority Data

Apr. 21, 1992 [GB] United Kingdom ............... 9208524

[51] Int. Cl.⁶ ............................................. G01V 1/40
[52] U.S. Cl. ...................................... 367/25; 367/83; 181/106; 175/50
[58] Field of Search .................. 367/25, 83; 181/106; 166/250; 175/40, 50; 340/854.3

[56] References Cited

U.S. PATENT DOCUMENTS

| | | | |
|---|---|---|---|
| 2,938,592 | 5/1960 | Charske et al. | 181/0.5 |
| 3,190,388 | 6/1965 | Moser et al. | 181/0.5 |
| 4,553,226 | 11/1985 | Scherbatskoy | 367/83 |
| 4,665,511 | 5/1987 | Rodney et al. | 367/35 |
| 4,945,761 | 8/1990 | Lessi et al. | 175/40 |

*Primary Examiner*—Ian J. Lobo
*Attorney, Agent, or Firm*—Geoffrey A. Mantooth

[57] ABSTRACT

A method and apparatus for sonic logging using a measuring while drilling telemetry system as the sonic source is provided. Transducers are provided for receiving acoustic energy from the formation surrounding the borehole. The transducers produce a signal which is processed and telemetered to the surface using the measuring while drilling system.

1 Claim, 4 Drawing Sheets

SONIC MEASUREMENT WHILE DRILLING

FIELD OF THE INVENTION

The present invention relates to sonic well logging that occurs inside of boreholes such as are drilled for oil and gas.

BACKGROUND OF THE INVENTION

Acoustic well logging is disclosed in Moser et al., U.S. Pat. No. 3,190,388. An acoustic well logging tool is lowered into a fluid filled borehole. The tool has a transducer for producing acoustic energy that propagates through the borehole fluid and into the formation. Receiving transducers on the tool receive the acoustic energy. Electrical signals containing information about the received acoustic energy are transmitted to the surface by way of a cable.

My U.S. Pat. No. 4,553,226 discloses systems, apparatus and methods for measuring while drilling. Various downhole parameters, such as well bore inclination, temperature, pressure and so on can be measured and transmitted to the surface while drilling. The transmission media is the drilling fluid in the borehole. The downhole tool produces pressure pulses in the drilling fluid, which pulses are received by sensors on the surface.

There are also prior art systems that use acoustic energy sources located downhole and receiving sensors, such as geophones, located on the surface some distance away from the borehole. The surface geophones receive the acoustic energy after it propagates from the downhole tool through all of the formations leading up to the surface. The geophones are likely connected to processing and storage systems on the surface by cables.

DESCRIPTION OF PREFERRED EMBODIMENT

Figure 1:
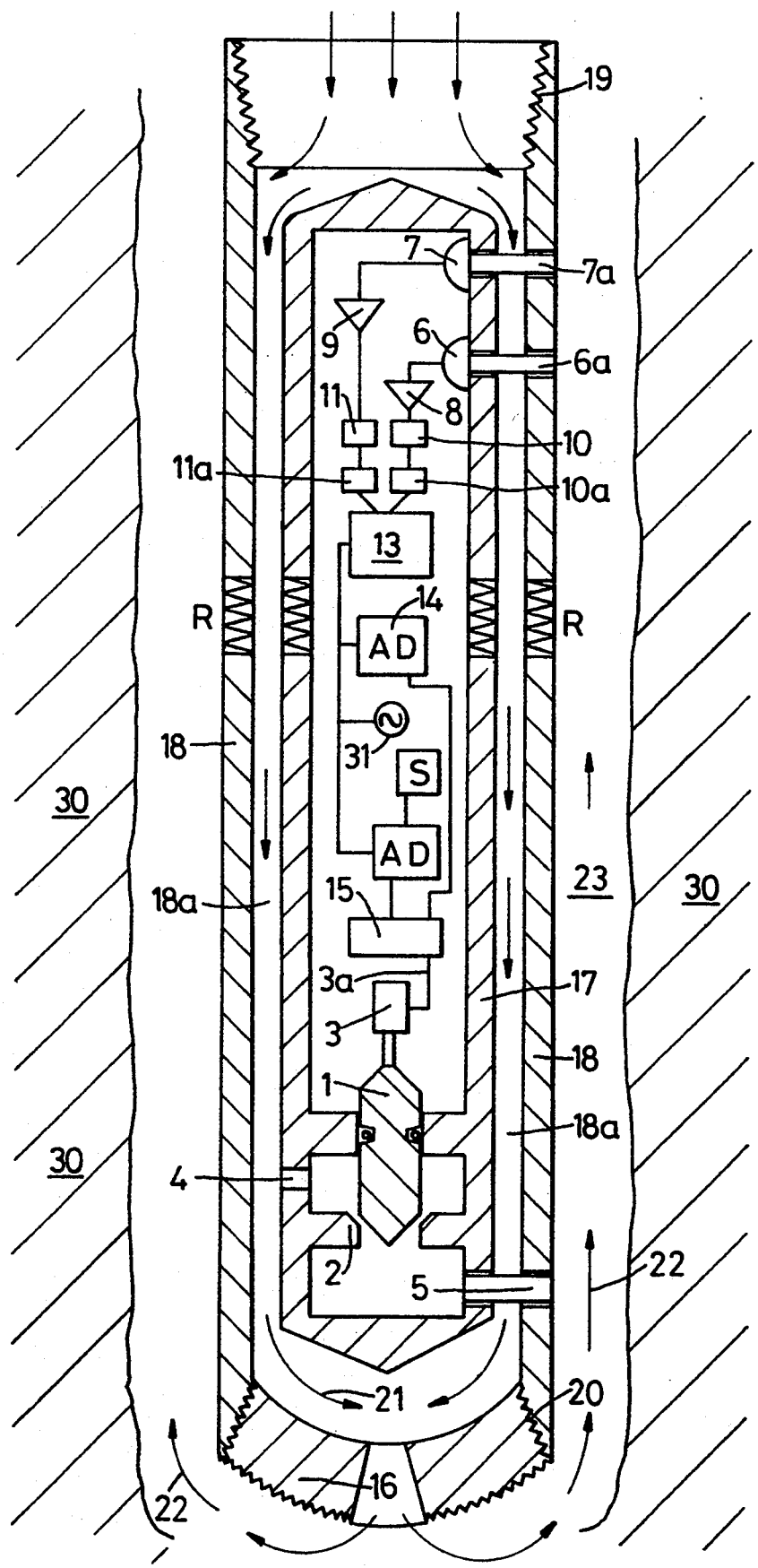
FIG. 1 is a longitudinal cross-sectional view of the apparatus of the present invention, in accordance with a preferred embodiment, as located in a borehole.

FIG. 1 shows diagrammatically the Measurement While Drilling downhole Tool 17. It is supported inside a standard drill Collar 18 provided with an upper thread 19 and a lower thread 20. At the bottom there may be a drill bit 16 or a further drill collar can be provided. The tool 17 is supported inside the drill collar 18 by means not shown. Drilling mud circulates downwardly as shown by the arrows and then upwardly through the annulus 23 as shown by the arrows 22.

Figure 2:
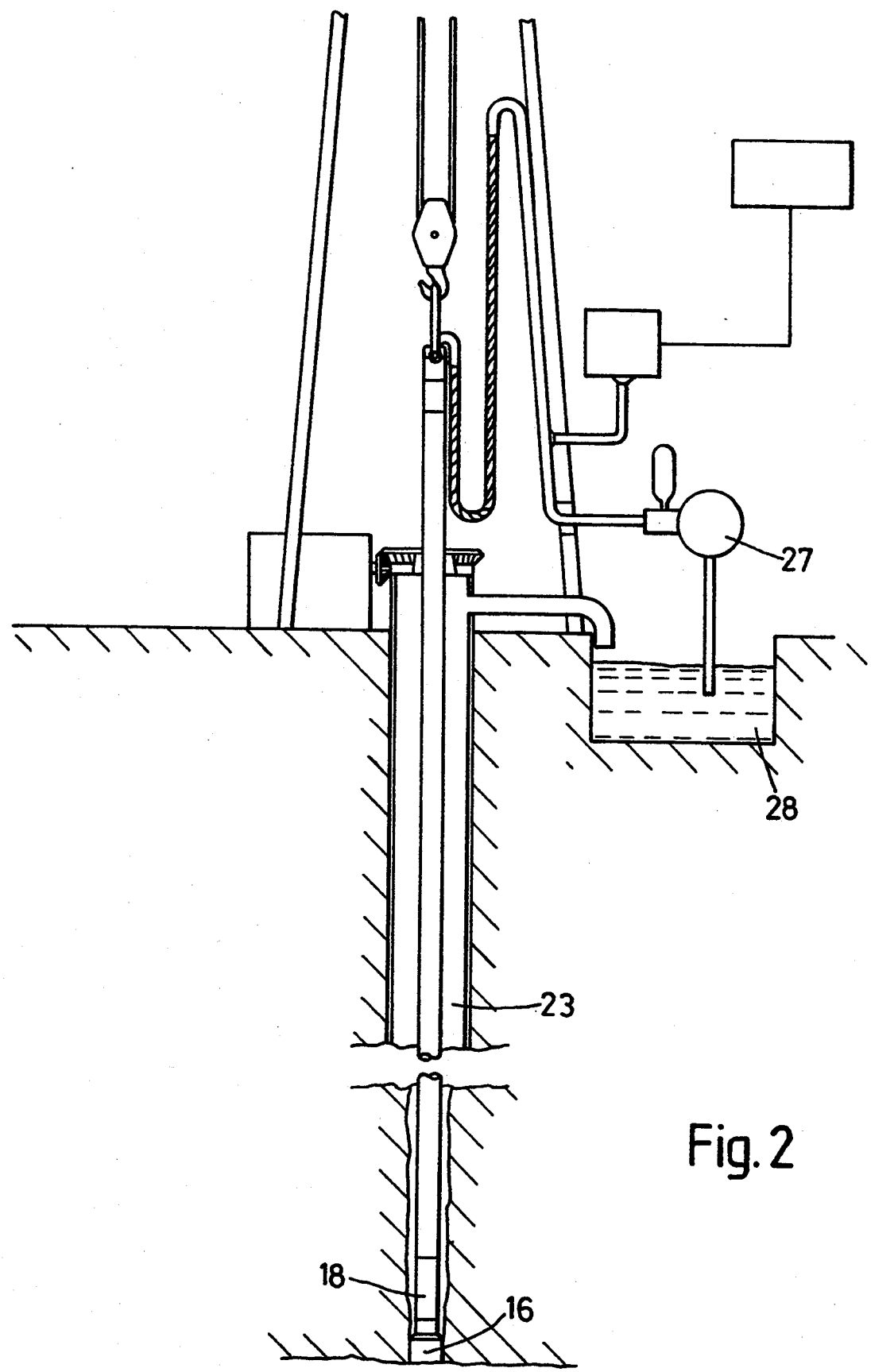
FIG. 2 is a schematic view of a rotary drilling rig showing the drill bit and surface equipment.

A pump 27 as on FIG. 2 is provided at the surface to force the mud through the circulation channel from the mud pit 28 and back to the surface through the annulus 23. FIG. 2 also shows a Pressure Transducer 40 and Surface Equipment 41—which is standard since the information of the sonic properties is sent to the surface in standard code form (for example pressure pulses arranged in a binary code).

In FIG. 1, Numeral 1 indicates a valve stem and 2 a valve seat. The valve stem is actuated by a solenoid or other mechanical drive means 3. This mechanical drive can be electromagnetic or hydraulic and by one means or another is made to actuate the valve stem 1 in response to an electric impulse impressed on wire 3a. When the valve (stem 1 and seat 2) is actuated it opens or closes the passageway from inlet 4 to outlet 5 and this controls some of the flow of drilling mud from the inside (the region 18a) to the annulus region 23 between the drill collar and the formation being drilled 30.

When the passageway 4-1-2-5 is suddenly opened or suddenly closed a pressure pulse is generated in the inside and outside of the drill collar 18. This pressure pulse propagates to the surface along the inside and along the outside of the drill collar 18 in a manner that is described in detail in my U.S. Pat. No. 4,553,226 which is incorporated in this patent Application by reference.

Referring to FIG. 1 and FIG. 2 the pressure signal generated at the exit port 5 propagates upwardly through the mud column and through the environing formation 30.

This pulse signal travels as follows: first through the steel drill collar where the velocity of propagation is the highest (of the order of 20,000 feet per second).

Second through the environing earth formation where the velocity is somewhat lower (about 10,000 feet per second).

Third through the drilling mud where the velocity is the lowest (about 5,000 feet per second). Because of the presence of gas and dispersed solids it can be considerably lower.

Acoustic well logging is an old art but this invention is concerned with an improvement which makes acoustic logging possible during the drilling operations, in other words acoustic MWD (Measurement While Drilling). For further description of the acoustic logging principle see U.S. Pat. No. 3,190,388 which is included in this specification by reference.

The pulse signal is received at the pressure transducers 6 and 7 that are responsive to the pressure signals at the outside through the ports 6a and 7a.

The outputs of the pressure transducers (6, 7) are first amplified (in 8 and 9) and then processed in accordance with standard acoustic logging procedures (by processors 10 and 11) and then fed into conventional "single shot" multivibrators (10a, 11a) which produce at their output a standardized single impulse or pulse which bears a precise time relationship to the time of arrival of the seismic pulse at the transducer 6 or 7.

The processors 10 and 11 are similar to those used in standard wireline acoustic logging systems—i.e., they remove the unwanted signals such as drilling noise and the unwanted signals (usually higher frequencies) that propagate through the steel of the drill collar 18 and the tool 17. These "direct waves" can be reduced or eliminated by the effects known as Rigid Sonde designated by R in FIG. 1 and described in U.S. Pat. No. 3,190,388.

Figure 3:
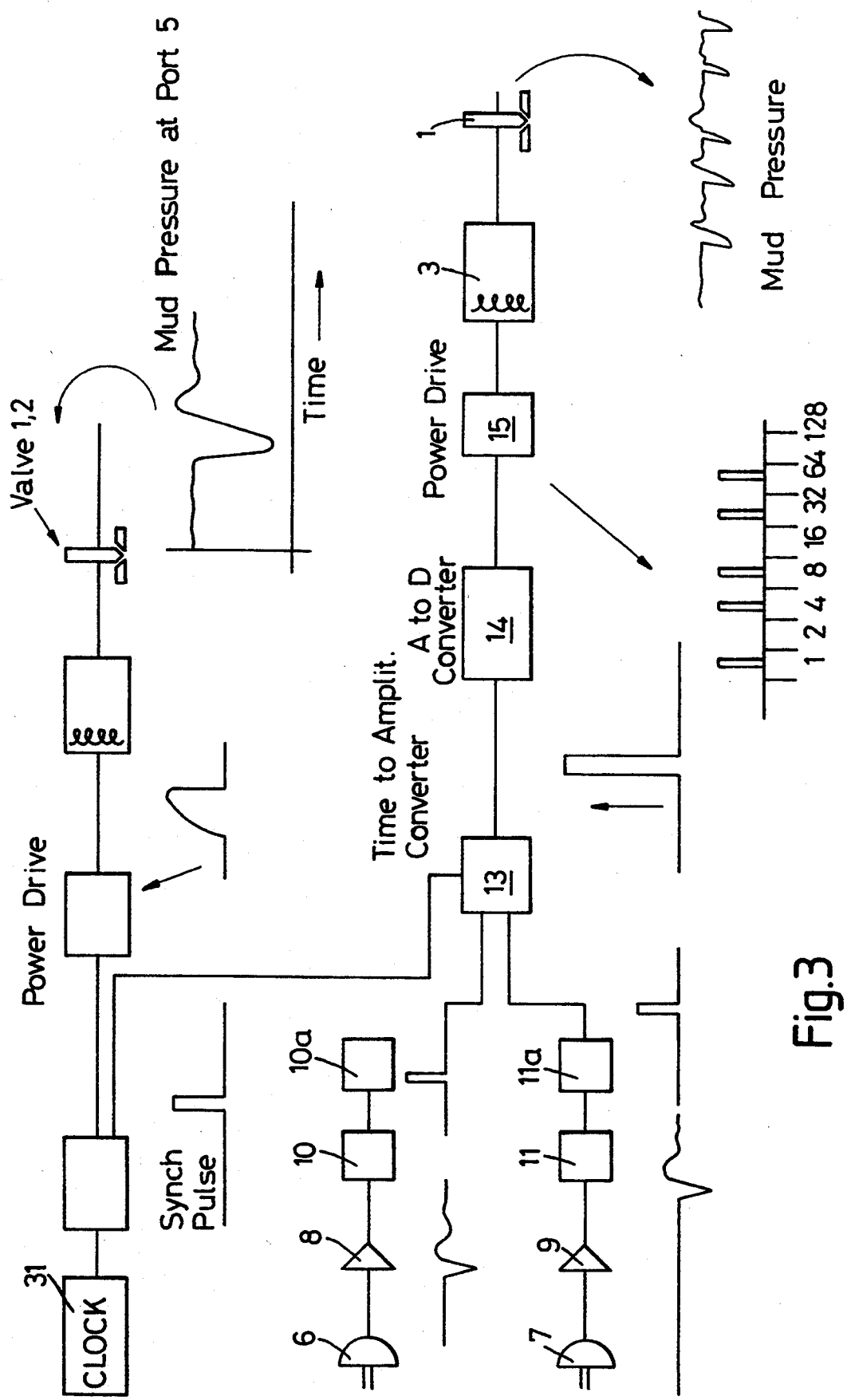
FIG. 3 is a block diagram of the downhole electronics.

FIG. 3 shows the circuitry of FIG. 1 in greater detail. Block 13 represents a well known electronic apparatus that produces an output pulse whose magnitude is proportional to the time difference between the arrivals of two input pulses from the pressure transducers 6, 7. It is known as a Time to Amplitude Converter. Since the time difference between the two arrivals is an indication of the sonic velocity the magnitude of the signals at the wire between block 13 and the A-D converter 14 represents the sonic velocity through the surrounding medium.

The power drive 15 is as shown as the circuit 12 of FIG. 3E of my U.S. Pat. No. 4,553,226 which is included in this application by reference. The power drive 15 includes two powerful Darlington or equivalent power transistors that actuate the solenoid 3 for driving the valve 1.

It should be noted that in FIG. 1 I show also a sensor S. This sensor and its associated circuitry is one of the standard sensors used in MWD for example an inclinometer—it functions in addition to the sonic logging apparatus which is the subject of this invention, i.e., by well known procedures of multiplexing, the apparatus shown in FIG. 1 is designed to produce a regular MWD log of, for example inclination, using the valve 1-2 for telecommunicating inclination data to the surface by means of the pulses generated by the valve 1-2 and at the same time use the pulses from the valve 1-2 to produce the signals needed for the sonic log. The entire system is maintained in synchronism by the electric "clock" 31.

Figure 4:
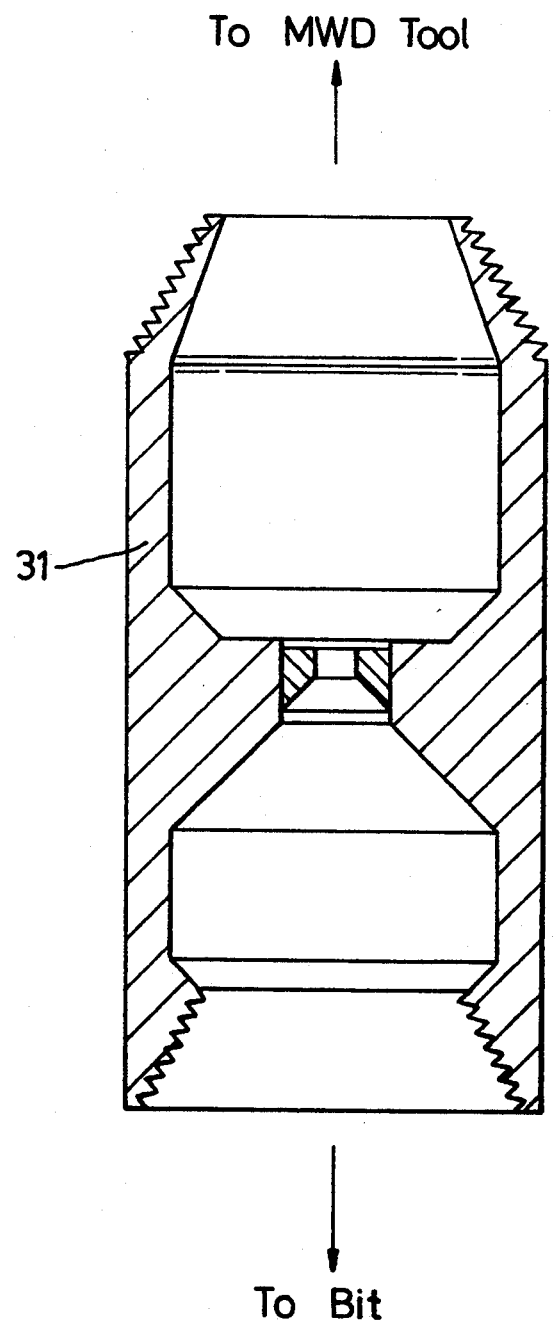
FIG. 4 is a schematic longitudinal cross-sectional view of a restrictor that can be used with the apparatus of FIG. 1.

FIG. 4 shows an additional device—a "restrictor" that can be placed in the mud circuit below the tool of FIG. 1 and the bottom of the well, i.e., the bit. The purpose of this restrictor is to increase the pressure differential between the inside of the collar and the annulus, since sometimes in modern drilling methods very low differential pressures and high flows are employed. In reference to FIG. 4, 33 indicates the special restrictor sub and in its interior is a non-erodible insert 43 such as Tungsten Carbide bit nozzle as manufactured by Dresser Industries, Inc. of Dallas, Tex. U.S.A.

It must be pointed out that the sonic barriers R of FIG. 1 may sometimes be difficult to install and also the separation between the "sound source" of the valve 1-2 and the detectors 6 and 7 may sometimes be required to be of substantial length.

In such cases it may be necessary to provide separate housings for the detectors 6 and 7 and locate them at considerable distance above or below the main housing 17 of FIG. 1.

I claim:

1. A system for measuring a characteristic of formations surrounding a drill hole during drilling operations using a fluid circulation system, said fluid circulation system comprising a drill string through which drilling fluid is forced to flow under pressure downwardly through said drill string from the earth's surface towards a downhole location near a lower end of said drill string, said circulation system also comprising an annulus surrounding said drill string from said downhole location to the earth's surface, said drilling fluid flowing upwardly through the annulus, said measuring system comprising:
   a) a flow restriction at said downhole location and within said circulation system, said restriction establishing within said circulation system a fluid high pressure zone and a fluid low pressure zone; a channel for passing fluid between said zones;
   b) downhole pressure pulse generator means comprising a valve in said channel and means for operating said valve and generating fluid pressure pulses within said circulation system, said generated fluid pressure pulses interacting with the formations adjacent said circulation system thereby producing formation pressure pulses within said formations;
   c) downhole pressure pulse receiving means comprising two fluid pressure transducers in said annulus and spaced unequally from said downhole pressure pulse generator means, said fluid pressure transducers being responsive to said formation pressure pulses as they are returned from said formations to said drilling fluid;
   d) said downhole pressure pulse receiving means also comprising means for combining the outputs of said two transducers and generating an output signal representative of such combination, said output signal being representative of a characteristic of said formations; and
   e) said output signal being provided to an input of said means for operating said valve, wherein said output signal is telemetered to the surface by way of said circulation system.

* * * * *